United States Patent
Bratkovski et al.

(10) Patent No.: US 7,352,941 B2
(45) Date of Patent: Apr. 1, 2008

(54) METHOD AND APPARATUS FOR ELECTROMAGNETIC RESONANCE AND AMPLIFICATION USING NEGATIVE INDEX MATERIAL

(75) Inventors: Alexandre M. Bratkovski, Mountain View, CA (US); Raymond Beausoleil, Redmond, WA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/590,410

(22) Filed: Oct. 31, 2006

(65) Prior Publication Data

US 2007/0115540 A1 May 24, 2007

Related U.S. Application Data

(63) Continuation-in-part of application No. 11/230,216, filed on Sep. 19, 2005, and a continuation-in-part of application No. 11/230,159, filed on Sep. 19, 2005.

(51) Int. Cl.
*G02B 6/10* (2006.01)
*G02F 1/29* (2006.01)
*G01B 9/02* (2006.01)
*H01S 3/08* (2006.01)

(52) U.S. Cl. ................... 385/129; 359/319; 359/346; 356/480; 372/92

(58) Field of Classification Search ............... 359/319, 359/346; 385/129; 356/480; 372/92
See application file for complete search history.

(56) References Cited

U.S. PATENT DOCUMENTS

| | | | |
|---|---|---|---|
| 6,822,784 B2 | 11/2004 | Fukshima et al. | |
| 6,865,009 B2 | 3/2005 | Nishioka | |
| 6,870,517 B1 | 3/2005 | Anderson | |
| 6,931,191 B2 | 8/2005 | Kitagawa et al. | |
| 6,975,664 B1 | 12/2005 | Dodabalapur et al. | |
| 7,064,886 B2 | 6/2006 | Moon et al. | |
| 2003/0042487 A1 | 3/2003 | Sarychev et al. | |
| 2003/0223721 A1 | 12/2003 | Povinelli et al. | |
| 2003/0227415 A1* | 12/2003 | Joannopoulos et al. | 343/754 |

(Continued)

OTHER PUBLICATIONS

Natomi, M., "Theory of light propagation in strongly modulated photonic crystals: Refractionlike behavior in the vicinity of the photonic band gap", Physical Review B, vol. 62, 10696-705 (2000).*

(Continued)

*Primary Examiner*—Frank G. Font
*Assistant Examiner*—Charlie Peng (57) ABSTRACT

An electromagnetic resonance device includes an input reflector, an output reflector, and a negative index material (NIM) disposed between the input reflector and the output reflector. The input reflector and output reflector are configured to be reflective to radiation having a wavelength of interest. The NIM is configured to have a negative refraction at the wavelength of interest. A first radiation is reflected by the input reflector toward the first surface of the NIM, passes through the NIM, and is focused on the output reflector as a second radiation. The second radiation is reflected by the output reflector toward the second surface of the NIM, passes through the NIM, and is focused on the input reflector as the first radiation. A gain medium may be included to amplify the first radiation and the second radiation to generate a laser radiation.

22 Claims, 8 Drawing Sheets

U.S. PATENT DOCUMENTS

2004/0091010 A1 5/2004 Choquette et al.
2006/0050412 A1 3/2006 Ito et al.
2006/0171032 A1* 8/2006 Nishioka .................... 359/566

OTHER PUBLICATIONS

Berrier, A., et al., Negative Refraction at Infrared Wavelengths in a Two-Dimensional Photonic Crystal, Physical Review Letters, vol. 93, No. 7, 4 pages, Aug. 13, 2004.
Cowan, B., et al., Photonic Crystal Laser Accelerator Structures, Proceedings of the 2003 Particle Accelerator Conference, pp. 1855-1857, © 2003 IEEE.
Fang, Nicholas, et al., Reports, Sub-Diffraction-Limited Optical Imaging with a Silver Superlens, Science, vol. 308, pp. 534-537, Apr. 22, 2005.
Gersen, H., et al., Direct Observation of Bloch Harmonics and Negative Phase Velocity in Photonic Crystal Waveguides, Physical Review Letters, vol. 94, No. 12, Apr. 1, 2005.
Inoue, K., et al., Photonic Crystals, Physics, Fabrication and Applications, Springer-Verlag Berlin Heidelberg 2004.
Jamois, C., et al., Silicon-based two-dimensional photonic crystal waveguides, Photonics and Nanostructures—Fundamentals and Applications 1, pp. 1-13, 2003.
Joannopoulos, John D., et al., Photonic Crystals, Molding the Flow of Light, Princeton University Press 1995.
Kramper, Patrick, et al., Near-field visualization of light confinement in a photonic crystal microresonator, Optics Letters, vol. 29, No. 2, pp. 174-176, Jan. 15, 2004.
Kramper, P., et al., Highly Directional Emission from Photonic Crystal Waveguides of Subwavelength Width, Physical Review Letters, vol. 92, No. 11, 4 pages, Mar. 19, 2004.
Lagarkov, A.N., et al., Near-Perfect Imaging in a Focusing System Based on a Left-Handed-Material Plate, Physical Review Letters, vol. 92, No. 7, 4 pages, Feb. 20, 2004.
Lee, Y.H., et al., Low Threshold 2-D Photonic Crystal Lasers, TuK2, 0-7803-7500-9/02, pp. 219-220, © 2002 IEEE.
Linden, Stefan, et al., Magnetic Response of Metamaterials at 100 Terahertz, Science, vol. 306, pp. 1351-1353, Nov. 19, 2004.
Liu, Liu, et al., Near-field optical storage system using a solid immersion lens with a left-handed material slab, Optics Express 4836, vol. 12, No. 20, 6 pages, Oct. 4, 2004.
Parazzoli, C.G., et al., Experimental Verification and Simulation of Negative Index of Refraction Using Snell's Law, Physical Review Letters, vol. 90. No. 10., 4 pages, Mar. 14, 2003.
Pendry, J.B., Negative Refraction Makes a Perfect Lens, Physical Review Letters, vol. 85, No. 18, pp. 3966-3969, Oct. 30, 2000.
Pendry, John B., et al., Reversing Light: Negative Refraction, Physics Today, 8 pages, Dec. 2003.
Prasad, Tushar, et al., Superprism phenomenon in three-dimensional macroporous polymer photonic crystals, Physical Review B 67, 7 pages, 2003.
Qiu, Min, et al., Wave Propagation Through a Photonic Crystal in a Negative Phase Refractive-Index Region, IEEE Journal of Selected Topics in Quantum Electronics, vol. 9, No. 1, pp. 106-110, Jan./Feb. 2003.
Ramakrishna, S. Anantha, et al., Removal of absorption and increase in resolution in a near-field lens via optical gain, Physical Review B 67, 4 pages, 2003.
Ripoll, Jorge, et al., Optimal tuning of lasing modes through collective particle resonance, J. Opt. Soc. Am. B, vol. 21, No. 1, pp. 141-149, Jan. 2004.
Schonbrun, Ethan, et al., Negative Refraction in a Si-Polymer Photonic Crystal Membrane, IEEE Photonics Technology Letters, 3 pages, © 2005 IEEE.
Smith, David R., et al., Design and Measurement of Anisotropic Metamaterials that Exhibit Negative Refraction, IEICE Trans. Electron., vol. E87-C, No. 3, pp. 359-370, Mar. 2004.
Smith, David R., et al., Partial focusing of radiation by a slab of indefinite media, Applied Physics Letters, vol. 84. No. 13, pp. 2244-2246, Mar. 29, 2004.
Smith, D.R., et al., Metamaterials and Negative Refractive Index, Science, vol. 305, pp. 788-792, Aug. 6, 2004.
Srituravanich, Werayut, et al., Plasmonic Nanolithography, Nano Letters, vol. 4, No. 6, pp. 1085-1088, 2004.
Srituravanich, W., et al., Sub-100 nm lithography using ultrashort wavelength of surface plasmons, J. Vac. Sci. Technol. B 22(6), pp. 3475-3478, Nov./Dec. 2004.
Wang, X., et al., Unrestricted superlensing in a triangular two-dimensional photonic crystal, Optics Express 2919, vol. 12, No. 13, 6 pages, Jun. 28, 2004.

* cited by examiner

METHOD AND APPARATUS FOR ELECTROMAGNETIC RESONANCE AND AMPLIFICATION USING NEGATIVE INDEX MATERIAL

RELATED APPLICATIONS

This application is a continuation-in-part of U.S. patent application Ser. No. 11/230,216 entitled METHOD AND APPARATUS FOR ELECTROMAGNETIC RESONANCE USING NEGATIVE INDEX MATERIAL filed Sep. 19, 2005 and also a continuation-in-part of U.S. patent application Ser. No. 11/230,159 entitled METHOD AND APPARATUS FOR MODIFYING AN ELECTROMAGNETIC RADIATION BEAM filed Sep. 19, 2005.

FIELD OF THE INVENTION

The present invention relates generally to modifying an electromagnetic radiation beam and more particularly to devices with a negative refractive index and structures for generating electromagnetic resonance using negative refraction.

The content of the above-identified disclosures are hereby incorporated by reference.

BACKGROUND OF THE INVENTION

Photonic crystals are a class of man-made materials, which are often referred to as "meta-materials." Photonic crystals are formed by dispersing a material of one dielectric constant periodically within a matrix having a different dielectric constant. A one-dimensional photonic crystal is a three-dimensional structure that exhibits periodicity in dielectric constant in only one dimension. Bragg mirrors are an example of a one-dimensional photonic crystal. The alternating thin layers have different dielectric constants and refractive indices. The combination of several thin layers forms a three-dimensional structure that exhibits periodicity in dielectric constant in only the direction orthogonal to the planes of the thin layers. No periodicity is exhibited in either of the two dimensions contained within the plane of the layers.

A two-dimensional (2D) photonic crystal can be formed by periodically dispersing rods or columns of a material of one dielectric constant within a matrix having a different dielectric constant. 2D photonic crystals exhibit periodicity in two dimensions (i.e., the directions perpendicular to the length of the rods or columns) but no periodicity is exhibited in the direction parallel to the length of the columns.

Finally, a three-dimensional photonic crystal can be formed by periodically dispersing small spheres or other spatially confined areas of a first material having a first dielectric constant within a matrix of a second material having a second, different, dielectric constant. Three-dimensional photonic crystals exhibit periodicity in dielectric constant in all three dimensions within the crystal.

Photonic crystals may exhibit a photonic bandgap over a range of frequencies in directions exhibiting periodicity in dielectric constant. In other words, there may be a range of frequencies of electromagnetic radiation that will not be transmitted through the photonic crystal in the directions exhibiting dielectric periodicity. This range of frequencies that are not transmitted is known as a photonic bandgap of the photonic crystal.

For an introduction to photonic crystals and their uses and applications, the reader is referred to John D. Joannopoulos, Robert D. Meade & Joshua N. Winn, *Photonic Crystals—Molding the Flow of Light*, (Princeton University Press 1995) and K. Inoue & K. Ithaca, *Photonic Crystals—Physics, Fabrication and Applications*, (Springer 2004)

In natural materials, electromagnetic radiation is refracted at a specific angle and in a specific direction when it encounters a junction between two materials. A class of meta-materials has been studied that refract electromagnetic radiation in the opposite direction from the direction of natural materials. These materials exhibiting negative refraction are often called super-lenses for their ability to produce images with sub-wavelength resolution. Recently, it has been shown that photonic crystals may exhibit this negative refractive index. Many new and useful applications may be possible for these super-lens structures, particularly photonic crystals exhibiting negative refraction.

BRIEF SUMMARY OF THE INVENTION

The present invention, in a number of embodiments, includes methods of developing and amplifying resonance in an electromagnetic radiation beam using negative super-lens properties, wherein negative refraction properties of a negative index material may be used to create resonant structures.

An embodiment of the present invention includes an electromagnetic resonance device comprising an input reflector, an output reflector, and a negative index material disposed between the input reflector and the output reflector and configured to exhibit a negative refraction at a wavelength of interest. The input reflector is configured to be substantially reflective to a first radiation having the wavelength of interest. The output reflector is disposed in a plane substantially parallel to the input reflector and is configured be substantially reflective to a second radiation having the wavelength of interest. The negative index material is disposed between the input reflector and the output reflector and includes a first surface and a second surface, which are each in a plane substantially parallel to the input reflector. The negative refraction of the negative index material focuses the first radiation impinging on the first surface as the second radiation at a second focal location. Similarly, the negative refraction of the negative index material focuses the second radiation impinging on the second surface as the first radiation at a first focal location. A gain medium may be disposed between the input reflector and the output reflector and configured to provide gain at the same wavelength of interest. The gain medium may be integrated within the negative index material, or it may be inserted between the negative index material and either or both reflectors.

Another embodiment of the present invention comprises a method of intensifying an electromagnetic radiation beam. The method includes providing a negative index material including a negative refractive index at a wavelength of interest. A first radiation is reflected toward a first surface of the negative index material and a second radiation is reflected toward a second surface of the negative index material. The method further includes focusing the second radiation at a second focal location by the first radiation passing through the negative index material from the first surface to the second surface. The first radiation is focused at a first focal location by the second radiation passing through the negative index material from the second surface to the first surface. A gain medium may be included and configured to provide gain at the same wavelength of interest. The gain medium may be integrated within the negative index material, or it may be inserted between the negative index material and either or both reflectors.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

In the following description, micron-scale dimensions refer roughly to dimensions that range from one micrometer up to a few micrometers, sub-micron scale dimensions refer roughly to dimensions that range from 1 micrometer down to 0.05 micrometers, and nanometer scale dimensions refer roughly to dimensions that range from 1 nanometer up to 50 nanometers (0.05 micrometers).

The present invention, in a number of embodiments, includes electromagnetic radiation resonant structures and methods of developing resonance in an electromagnetic radiation beam. Embodiments of the present invention are configured for providing a periodic dielectric medium that includes a negative refractive index for radiation having a selected wavelength range. For radiation directed at a resonant structure (including the periodic dielectric medium) negative refraction of the radiation as it passes through the periodic dielectric medium (PDM) may generate a focused radiation and a resonance within the resonant structure. Furthermore, in some embodiments a gain medium may be included to provide amplification.

With regard to refraction, Snell's law is a well-known law that models refraction characteristics of a radiation beam as the radiation beam encounters an interface between two mediums with different refractive properties. Basically, Snell's law states that the product of the refractive index and the sine of the angle of incidence of a radiation beam in one medium is equal to the product of the refractive index and the sine of the angle of refraction in a successive medium.

Generally, naturally occurring materials exhibit a positive refractive index. In other words, a radiation beam with an oblique incident angle to a facet of a medium with a high positive refractive index may be deviated toward the surface normal of the facet, and a radiation beam entering a medium of lower refractive index may be deviated away from the surface normal, but the deviation occurs at a positive angle relative to the surface normal. Recently, a number of man-made materials (often referred to as meta-materials) have been developed that exhibit a negative refractive index. With a negative refractive index, the material still obeys Snell's law, but the radiation beam is deviated in the opposite direction from natural materials (i.e., with a negative angle relative to the surface normal). Thus, using Snell's law, the product of the refractive index and the sine of the angle of incidence of a radiation beam in one medium is equal to the negative of the product of the refractive index and the sine of the angle of refraction in a successive medium.

Figure 1A:
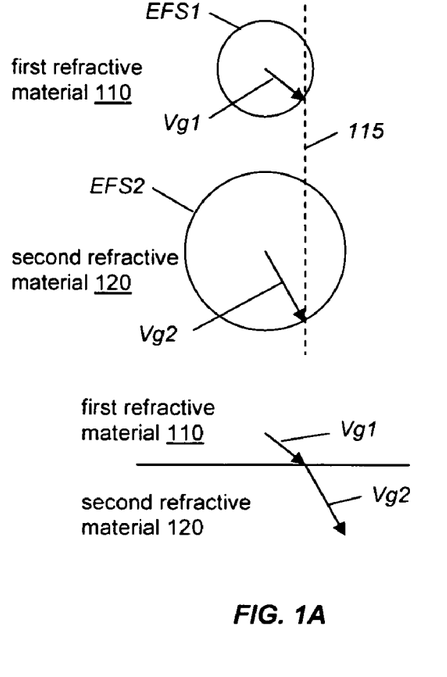
FIG. 1A is a wave-vector diagram illustrating directions of wave propagation at an interface between two isotropic materials.
Figure 1B:
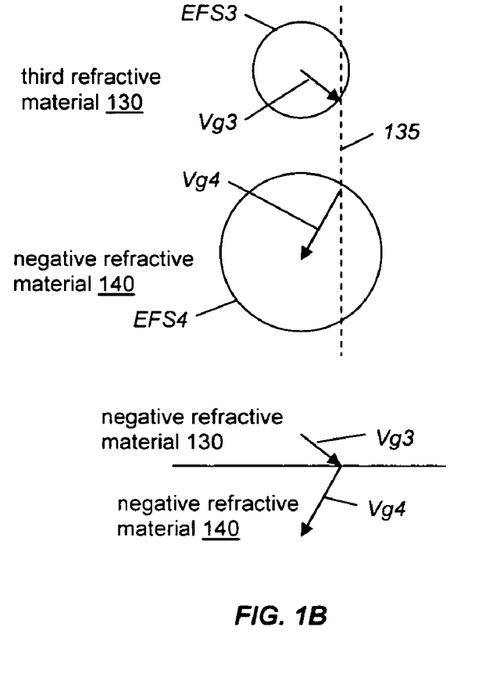
FIG. 1B is a wave-vector diagram illustrating directions of wave propagation at an interface between an isotropic material and a material exhibiting a negative refractive index.
Figure 2:
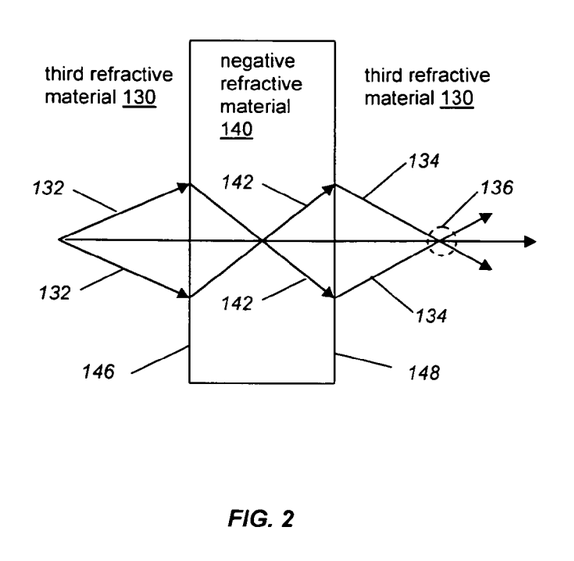
FIG. 2 illustrates focusing properties of electromagnetic radiation traveling through materials exhibiting a negative refractive index.

The refractive properties of a positive refractive index and a negative refractive index may be understood using FIGS. 1A, 1B, and 2. FIG. 1A is a wave-vector diagram illustrating directions of wave propagation through two refractive materials (110 and 120) and at the interface between the two refractive materials (110 and 120). Similarly, FIG. 1B is a wave-vector diagram illustrating directions of wave propagation at an interface between a third refractive material 130 and a negative refractive material 140.

FIG. 1A illustrates positive refraction. In FIG. 1A the upper circle illustrates an equal frequency surface EFS1 plot of a first refractive material 110. The lower circle illustrates an equal frequency surface EFS2 plot of a second refractive material 120. EFS2 is a different diameter than EFS1 due, in part, to the difference in dielectric properties between the first refractive material 110 and the second refractive material 120. Group velocity vector Vg1 is oriented perpendicular to, and away from the center of, EFS1 and illustrates the direction of wave propagation through the first refractive material 110. A first frequency line 115 illustrates a specific frequency at which group velocity vector Vg1 intersects EFS1. The first frequency line 115 is carried down to intersect with EFS2. Thus, a group velocity vector Vg2, oriented perpendicular to and away from the center of EFS2, defines the direction of wave propagation through the second refractive material 120 at the same frequency as the wave propagating through the first refractive material 110. The lower portion of FIG. 1A illustrates the two group velocity vectors Vg1 and Vg2 and the direction change that occurs at the boundary between the first refractive medium 110 and the second refractive medium 120. The direction change is due to the difference in the refractive index of the two refractive materials (110 and 120). The positive refraction can be seen by the positive angle from the surface normal for group velocity vector Vg2.

FIG. 1B illustrates negative refraction. In FIG. 1B the upper circle illustrates an equal frequency surface EFS3 plot of a third refractive material 130. The lower circle illustrates an equal frequency surface EFS4 plot of a negative refractive material 140. EFS4 is a different diameter than EFS3 due, in part, to the difference in dielectric properties between the first refractive material 110 and the negative refractive material 140. In addition, in negative refractive index material 140, as the frequency increases, the equal frequency surface EFS4 moves inward around the symmetry point. Therefore, the group velocity vector Vg4 points inward indicating negative refraction. As a result, group velocity vector Vg4, illustrating the direction of wave propagation through the negative refractive material 140, is oriented perpendicular to, but toward from the center of, EFS4.

On the other hand, the third refractive material 130 is a positive refractive material similar to the first refractive material 110 and the second refractive material 120. Therefore, group velocity vector Vg3 is oriented perpendicular to and away from the center of EFS3, and illustrates the direction of wave propagation through the third refractive material 130. A second frequency line 135 illustrates a specific frequency at which group velocity vector Vg3 intersects EFS3. The second frequency line 135 is carried down to intersect with EFS4. Thus, group velocity vector Vg4 defines the direction of wave propagation through the negative refractive material 140 of a wave at the same frequency as the wave propagating through the third refractive material 130. The lower portion of FIG. 1B illustrates the two group velocity vectors Vg3 and Vg4 and the direction change that occurs at the boundary between the third refractive medium 130 and the negative refractive medium 140. The negative refraction can be seen by the negative angle from the surface normal for group velocity vector Vg4.

FIG. 2 illustrates focusing properties of electromagnetic radiation traveling through a material exhibiting a negative refractive index. In FIG. 2, a top view illustrates a slab of negative refractive material 140, with third refractive material 130 on opposite sides of the negative refractive material 140. Incident electromagnetic radiation beams have first directions 132 when they impinge on an incident surface 146 of the negative refractive material 140. The negative refractive property of negative refractive material 140 cause the electromagnetic radiation beams to deviate towards second directions 142 with a negative angle from the surface normal of the incident surface 146. As the electromagnetic radiation beams emit from an emitting surface 148 of the negative refractive material 140, they deviate towards third directions 134. As the electromagnetic radiation beams travel in the third direction 134, they converge at a focal point 136.

Figure 3A:
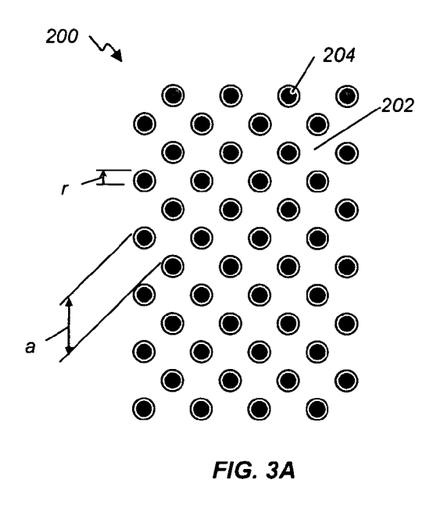
FIG. 3A illustrates a top view of a representative periodic dielectric medium comprising a 2D photonic crystal configured with a triangular lattice.
Figure 3B:
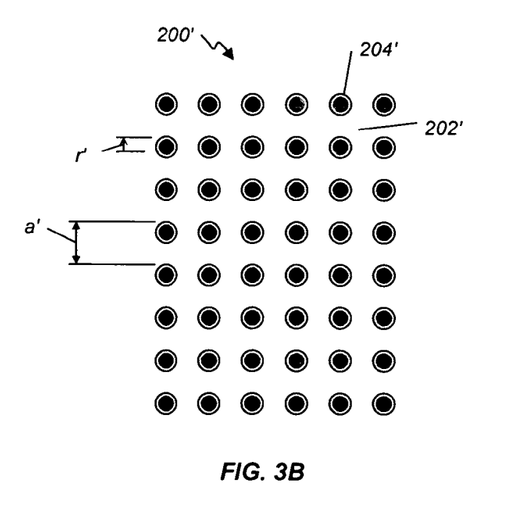
FIG. 3B illustrates a top view of a representative periodic dielectric medium comprising a 2D photonic crystal configured with a square lattice.
Figure 4:
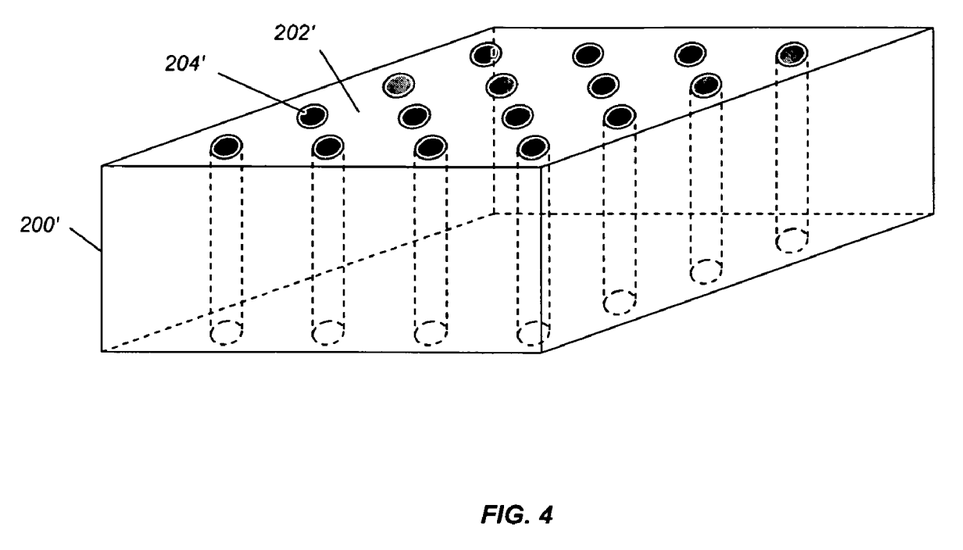
FIG. 4 is a three-dimensional view of a representative 2D photonic crystal configured with a square lattice.

Photonic crystals have been shown to posses this negative refractive property for certain proportions of the geometry of the photonic crystal relative to the wavelength of electromagnetic radiation that will experience the negative refraction. Some embodiments of photonic crystals are shown in FIGS. 3A, 3B, and 4. While most of the discussion herein is directed to photonic crystals as negative index material, those of ordinary skill in the art will recognize that other negative index materials may be used in embodiments of the present invention. By way of example, and not limitation, negative index materials may include swiss-roll structures and split-ring resonators.

FIG. 3A illustrates a top view of a negative index material configured as a periodic dielectric medium 200 comprising a 2D photonic crystal 200 configured with a triangular lattice (also referred to as a hexagonal lattice). The 2D photonic crystal 200 comprises a matrix 202 (also referred to as a first material 202). Within the matrix 202, periodically spaced columns 204 (also referred to as cylindrical regions, rods, or a second material) are disposed in an array of horizontal rows and vertical rows. As illustrated in FIG. 3A, these horizontal rows and vertical rows of rods 204 may be disposed to form a triangular lattice wherein each alternate horizontal row and vertical row is displace about half way between the adjacent horizontal row and vertical row.

FIG. 3B illustrates a top view of a periodic dielectric medium 200' comprising a 2D photonic crystal 200' configured with a square lattice, wherein the periodically spaced columns 204' in adjacent horizontal rows and vertical rows are orthogonally aligned within the matrix 202'. FIG. 4 shows a three-dimensional view of the 2D photonic crystal 200' of FIG. 3B to illustrate the lengthwise dispersion of the rods 204' through the matrix 202'.

In a 2D photonic crystal 200, the matrix 202 comprises a first material 202 with a first dielectric constant and the rods 204 comprise a second material 204 with a second dielectric constant. Thus, dielectric periodicity is exhibited in the photonic crystal in directions perpendicular to the longitudinal axis of the rods 204. If the difference in dielectric constant between the first material 202 and the second material 204 is large enough, a photonic bandgap (i.e., a forbidden frequency range) may occur. This photonic bandgap may create a variety of interesting properties for the photonic crystal. One of those properties is negative refraction.

By way of example and not limitation, a 2D photonic crystal 200 may comprise a matrix 202 of silicon with rods 204 of air, or a matrix 202 of air with rods 204 of silicon. In these embodiments, silicon has a dielectric constant of about 12 and air has a dielectric constant of about one. Other materials, such as, for example, InP, GaAs, and GaInAsP, have been shown to posses a photonic bandgap in combinations with each other and with air. Materials may be chosen to optimize a variety of parameters such as wavelengths where the photonic bandgap occurs, ease of manufacturing, negative refractive properties, or combinations thereof.

Referring to FIGS. 3A and 3B, the photonic crystals have a lattice constant (a, a'), which indicates the lateral spacing between the centers of adjacent rods 204, and the rods 204 have a substantially uniform radius (r, r'). For many purposes, it is useful to discuss a relative radius (i.e. $RR=r/a$) or discuss the radius (r) as a ratio of the lattice constant (a). By way of example and not limitation, a 2D photonic crystal 200 may be characterized with a lattice constant (a) and a radius proportional to the lattice constant (such as $r=0.4\,a$ and $r=0.35a$).

Determining the photonic band structure of a particular photonic crystal is a complex problem that involves solving Maxwell's equations and considering the periodic variation in the dielectric constant through the photonic crystal. Thus, the photonic band structure is at least partially a function of the dielectric constant of the matrix 202, the dielectric constant of the rods 204, the radius (r) of the rods 204, and the lattice constant (a). Computational methods for computing the band structure of a particular photonic crystal are known in the art. An explanation of these computational methods may be found in John D. Giannopoulos, Robert D. Meade & Joshua N. Winn, Photonic Crystals—Molding the Flow of Light, (Princeton University Press 1995), in particular at Appendix D.

Simulations have shown that the negative refractive property of a photonic crystal will be present for a range of wavelengths (λ) within a photonic bandgap of the photonic crystal. By way of example and not limitation, Qui et al. have presented simulations of a 2D photonic crystal 200 comprising InP—InGaAsP indicating a refractive index of about −0.73 with a ratio of lattice constant (a) to frequency (i.e., a/λ) of about 0.325 (IEEE Journal of Selected Topics in Quantum Electronics, Vol. 9, No. 1, January/February 2003, pp. 106-110). In other words, using this illustrative simulation, an infrared radiation beam with a wavelength of about 1230 nm may exhibit a refractive index of about −0.73 when passing through the 2D photonic crystal 200 with a lattice constant (a) of about 400 nm.

Figure 5:
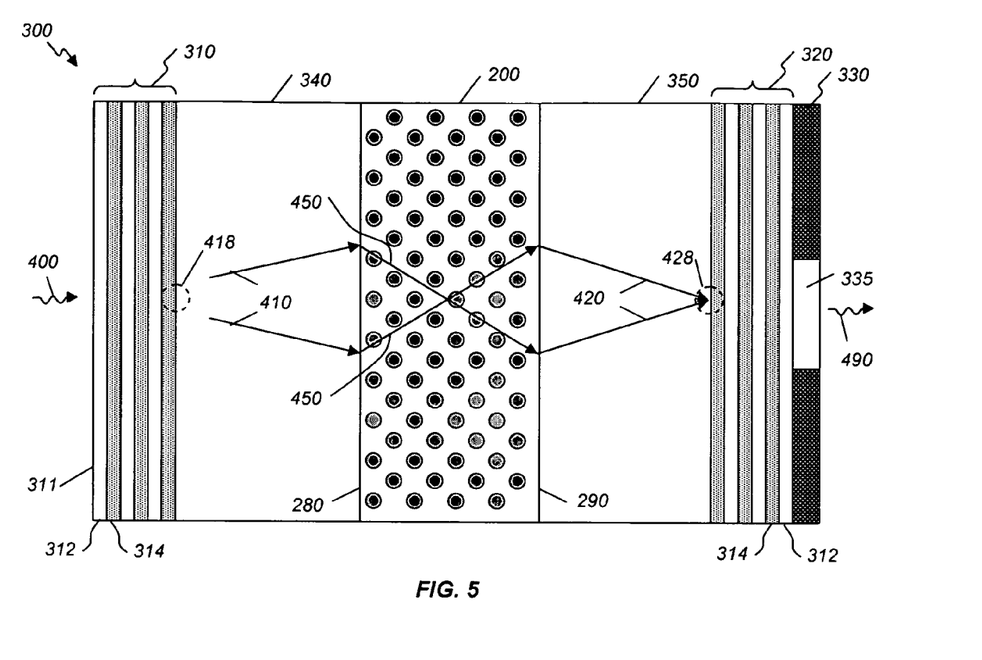
FIG. 5 is a top view of a representative electromagnetic radiation resonant structure including a 2D photonic crystal illustrating a negative refraction that focuses electromagnetic radiation.
Figure 6:
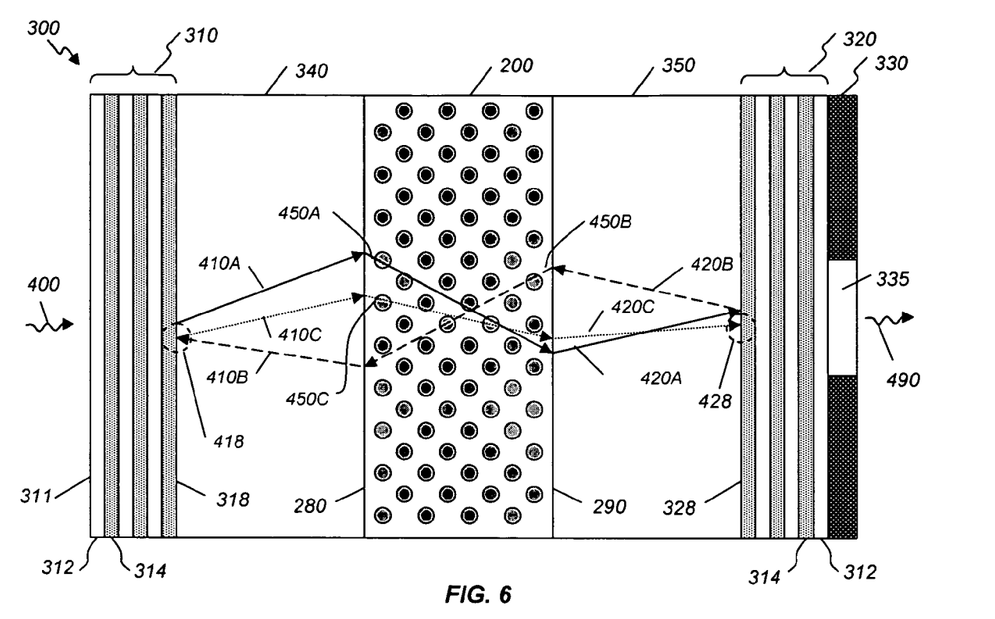
FIG. 6 is a top view of a representative electromagnetic radiation resonant structure including a 2D photonic crystal illustrating a negative refraction and resonance.

FIGS. 5 and 6 are top view illustrations of a representative electromagnetic resonance device 300 including a 2D photonic crystal 200 configured with a triangular lattice. The 2D photonic crystal 200 is positioned between an input reflector 310 and an output reflector 320.

The input reflector 310 and the output reflector 320 may be configured as Bragg reflectors. Bragg reflectors (also referred to as Bragg Mirrors) may be formed in a number of ways using a variety of materials configured as alternating layers having a low and a high refractive index. Each layer may be configured with a thickness of about a quarter wavelength of the wavelength of interest to be amplified by the electromagnetic resonance device 300. The resulting Bragg reflector may also be referred to as a quarter-wave stack. As an example, a Bragg reflector may be formed from alternating layers of GaAs (gallium arsenide) and AlGaAs (aluminum gallium arsenide). Another suitable material combination for forming Bragg reflectors is alternating layers formed respectively from silicon and silicon dioxide. Implementing a larger number of alternating pairs in a Bragg reflector results in a higher refractive index.

By way of example and not limitation, the input Bragg reflector 310 and the output Bragg reflector 320 may be formed from alternating first layers 312 and second layers 314. About twenty to twenty-five layers may result in a reflectivity of about 99.9%, whereas about thirty layers may create a reflectivity as high as 99.99%.

An opaque or highly reflective aperture layer 330 may optionally be formed on the output Bragg reflector 320 to create an aperture 335 configured with a desired size and shape for an emitting radiation 490, which may be emitted through the output reflector 320.

The input reflector 310 is separated from the periodic dielectric medium 200 by a first intermediate medium 340. Similarly, the output reflector 320 is separated from the periodic dielectric medium 200 by a second intermediate medium 350. The intermediate media (340, 350) may be the same material or may be different materials, depending on the desired refractive properties. By way of example and not limitation, the intermediate media (340, 350) may comprise air, silicon, or any other suitable material for transmission of the wavelength of interest.

The electromagnetic resonance device 300 receives radiation from an external incident radiation 400 substantially at the wavelength of interest and directed at an input surface 311 of the input reflector 310. A small portion of the external incident radiation 400 may be transmitted through the input reflector 310 and enter the first intermediate medium 340 as a first radiation 410.

FIG. 5 illustrates the focal properties of the periodic dielectric medium 200 due to negative refraction. The first radiation 410 travels through the first intermediate medium 340 and impinges on a first surface 280 of the periodic dielectric medium 200. The 2D photonic crystal 200 causes the first radiation 410 to deflect at a negative refraction angle at the interface between the first intermediate medium 340 and the 2D photonic crystal 200. The radiation passes through the 2D photonic crystal 200 as refracted radiation 450. When the refracted radiation 450 encounters the interface between the 2D photonic crystal 200 and the second intermediate medium 350, it is deflected again at a negative refraction angle. The refracted radiation 450 enters the second intermediate medium 350 as a second radiation 420. Overall, the negative refraction properties of the 2D photonic crystal 200 may cause the second radiation 420 to converge at a second focal location 428.

The lines illustrating first radiation 410, refracted radiation 450 and second radiation 420 are used to illustrate the approximate extent and direction of the radiation beams for ideal negative refraction. Those of ordinary skill in the art will recognize that all possible angles for the first radiation 410 and second radiation 420, along with corresponding refracted radiation 450 are implied by the drawings illustrating radiation beam refraction.

In addition, while not directly illustrated in FIG. 5, it will be readily apparent to those of ordinary skill in the art that the radiation may travel in the opposite direction. In other words, radiation may travel from the output reflector 320 towards the input reflector 310 to focus the radiation at a first focal location 418. This direction of travel is illustrated in FIG. 6.

FIG. 6 illustrates the resonance properties of the electromagnetic resonance device 300 by following a hypothetical electromagnetic radiation beam. The first radiation 410A travels through the first intermediate medium 340 and impinges on a first surface 280 of the periodic dielectric medium 200. The 2D photonic crystal 200 causes the first radiation 410A to deflect at a negative refraction angle at the interface between the first intermediate medium 340 and the 2D photonic crystal 200. The radiation passes through the 2D photonic crystal 200 as refracted radiation 450A. When the refracted radiation 450A encounters the interface between the 2D photonic crystal 200 and the second intermediate medium 350, it is deflected again at a negative refraction angle. The refracted radiation 450A enters the second intermediate medium 350 as a second radiation 420A.

The second radiation 420A is reflected back toward the 2D photonic crystal 200 as second radiation 420B. When second radiation 420B encounters the interface between the second intermediate medium 350 and the 2D photonic crystal 200, it is deflected again at a negative refraction angle to become refracted radiation 450B. When the refracted radiation 450B encounters the interface between the 2D photonic crystal 200 and the first intermediate medium 340, it is deflected again at a negative refraction angle to become first radiation 410B. First radiation 410B is reflected back toward the 2D photonic crystal 200 as first radiation 410C, which follows the same negative refraction process through the 2D photonic crystal to become refracted radiation 450C and second radiation 420C.

This resonance process of reflecting and focusing may continue indefinitely creating a high Q factor. The high Q factor may occur not only from the reflections, but also from the focusing and re-focusing at the first focal location 418 and the second focal location 428.

In addition, the Q factor may be increased by positioning the output mirror such that a second interior surface 328 of the output mirror is substantially near the second focal location 428. Similarly, the Q factor may be increased by positioning the input mirror such that a first interior surface 318 of the input mirror is substantially near the first focal location 418.

The output reflector 320 is not completely reflective. As a result, some of the radiation may be transmitted through the output reflector 320 as emitting radiation 490.

A laser may be formed by combining the high resonance cavity configuration of the FIG. 6 embodiment with a gain material to amplify intracavity radiation at the wavelength of interest. With sufficient gain from the gain material in combination with the feedback of the resonance cavity, lasing may result. In other words, the retro-reflection and negative index material refocusing creates a feedback mechanism and the gain material provides the amplification. If the double-pass unsaturated gain in the gain medium between the mirrors exceeds the round-trip loss, then laser oscillation may result.

With this laser configuration, the external incident radiation 400 is replaced with pump radiation 400' configured at a shorter wavelength than the lasing wavelength. Thus, in some embodiments it may be useful for the input reflector to be tuned more for transmission of the pump radiation 400' wavelength. This will enable more of the pump radiation 400' incident on the input mirror 310 to be transmitted into the resonance cavity, while still providing some resonance of the pump radiation. Thus, the reflectance level and reflectance wavelength may be a trade-off between, pump wavelength resonance, lasing wavelength resonance, and incident pump radiation transmission into the resonance cavity.

Figure 7:
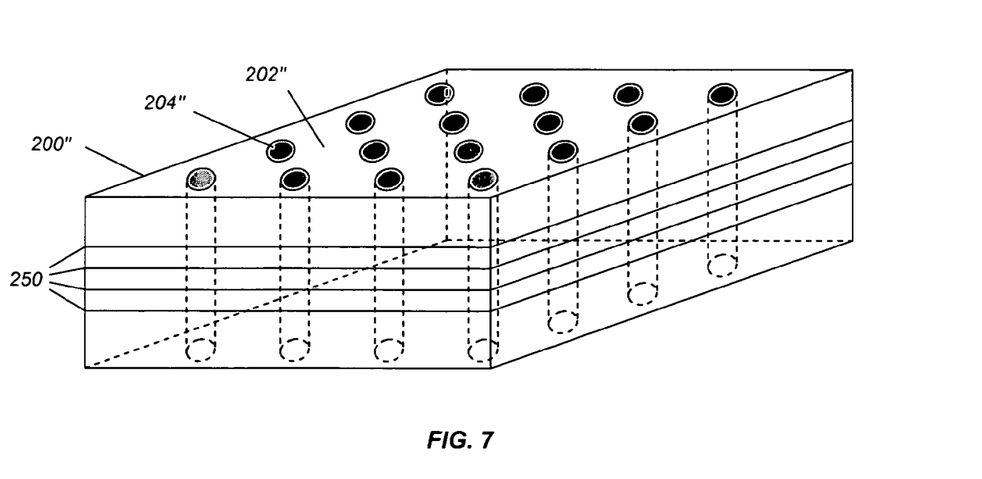
FIG. 7 is a three-dimensional view of a representative 2D photonic crystal configured with a square lattice and including a gain medium.

FIG. 7 illustrates a 2D photonic crystal 200" including a gain medium 250 disposed within and substantially across the lateral extents of the matrix 202" and substantially perpendicular to the rods 204". By way of example, and not limitation, the gain medium may be configured as one or more quantum well layers 250 disposed through the matrix 202". As an example, the embodiment shown in FIG. 7 includes four quantum well layers 250. The quantum wells may be formed during fabrication of the matrix 202". By way of example, and not limitation, quantum well layers 250 may be formed in a matrix 202" such as InP, GaAs, and GaInAsP using methods that are known to those skilled in the art.

In some resonance devices that use a negative index material other than 2D photonic crystal it may not be practical to include a gain material in the negative index material. In these embodiments, a gain medium may be included as part of the input reflector, the output reflector, or both.

Figure 8:
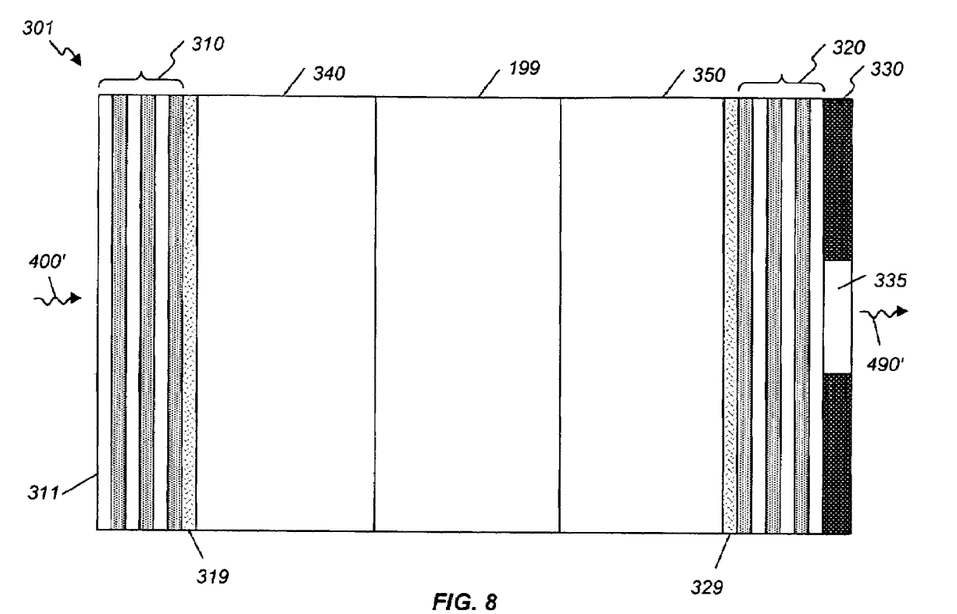
FIG. 8 is a top view of a representative laser device structure including a negative index material and gain medium.

FIG. 8 illustrates a laser device 301 including an input reflector 310, an output reflector 320 and a negative index material 199. As with the embodiments illustrated in FIGS. 5 and 6, the input reflector 310 is separated from the negative index material 199 by a first intermediate medium 340. Similarly, the output reflector 320 is separated from the negative index material by a second intermediate medium 350. The intermediate media (340, 350) may be the same material or may be different materials, depending on the desired refractive properties. By way of example and not limitation, the intermediate media (340, 350) may comprise air, silicon, or any other suitable material for transmission of the wavelength of interest.

The laser device 301 may include a first gain medium 319 disposed near the interior surface of the input reflector 310, a second gain medium 329 disposed near the interior surface of the output reflector 320, or both. By way of example and not limitation, the first gain medium 319 and the second gain medium 329 may be configured as one or more layers of quantum wells disposed on the interior surface of one or both of the reflectors (310 and 320). As previously discussed, the laser device acts as a laser by combining the high resonance cavity between the reflectors (310 and 320) with the first gain medium, the second gain medium, or both to amplify the pump radiation 400'. With sufficient gain from the gain medium in combination with the feedback of the resonance cavity, lasing may result. In other words, the retro-reflection and negative index material re-focusing creates a feedback mechanism and the gain material provides the amplification. If the double-pass unsaturated gain in the negative index material between the reflectors (310 and 320) exceeds the round-trip loss, then laser oscillation may result. At least some of the laser radiation may pass through the output reflector 320 and the aperture 335 in the aperture layer 330 as a laser emitting radiation 490'. The pump radiation 400' is absorbed by the gain medium, and some fraction of the pump energy is stored in the gain medium, available for use in amplification. Laser oscillation arises because light at the wavelength of interest that is spontaneously emitted into a resonance of the cavity is amplified by the gain medium. As the intracavity intensity grows, the gain saturates until the round-trip (double-pass) gain is equal to the round-trip loss (including output coupling). The law of conservation of energy requires that the pump wavelength be shorter than the laser wavelength (i.e., the "wavelength of interest"). Furthermore, as with conventional diode lasers, the gain medium may be pumped with current injection, rather than optical pumping.

As explained earlier, with this laser configuration, the pump radiation 400' is at a shorter wavelength than the lasing wavelength. Thus, in some embodiments it may be useful for the input reflector to be tuned more for transmission of the pump radiation 400' wavelength.

Figure 9:
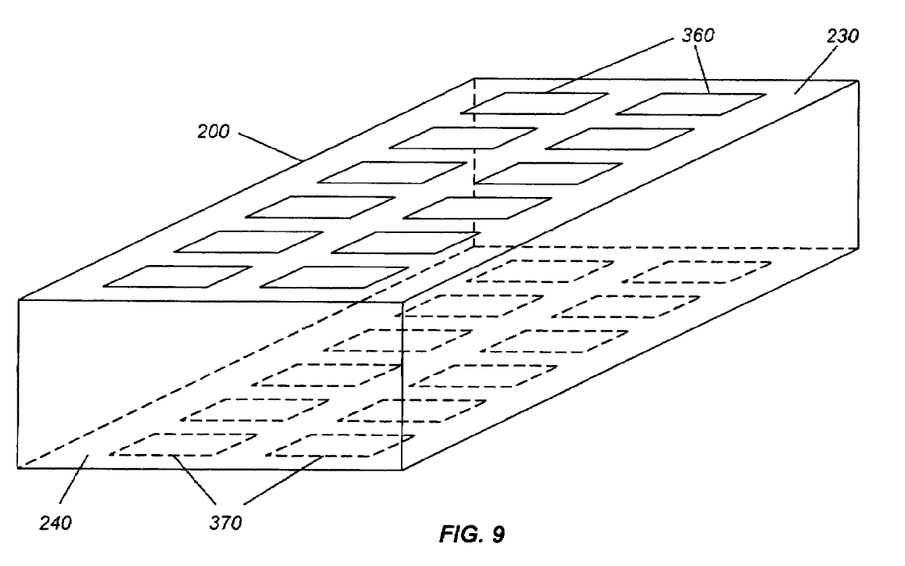
FIG. 9 is a three dimensional view of a representative 2D photonic crystal configured with electrodes on a first surface and a second surface of the periodic dielectric medium.

When the resonance cavity is configured with the negative index material including a periodic dielectric medium, the periodic dielectric medium may be configured as an electromagnetic radiation tuning device. FIG. 9 illustrates a periodic dielectric medium 200 configured with a set of first electrodes 360 on a third surface 230 and a set of second electrodes 370 on a fourth surface 240 of the periodic dielectric medium 200. Details of the rods within the periodic dielectric medium are omitted from the drawing to more clearly show the first electrodes 360 and second electrodes 370. It is noted that the descriptive terms third surface 230 and fourth surface 240 are used for convenience of discussion rather than referring to a specific direction or relative location. The third surface 230 and fourth surface 240 may be interchangeable and refer to the surfaces in planes substantially normal to the longitudinal axes of the rods 204 regardless of actual orientation of the 2D photonic crystal 200.

In addition, it will be recognized that the location and arrangement of first electrodes 360 and second electrodes 370 shown in FIG. 9 is only one representative embodiment. Many other locations, arrangements, sizes, and geometries of the first electrodes 360 and second electrodes 370 are contemplated within the scope of the invention. By way of example and not limitation, the electrodes may be round, triangular, hexagonal, or any other suitable shapes. The arrangement may comprise more or fewer rows and columns of electrodes on the first surface 230 and second surface 240. The first electrodes 360 and second electrodes 370 may be arranged in rectangular arrays, triangular arrays, hexagonal arrays, or other configurations useful for generating and modifying negative refractive properties.

Photonic crystals may be characterized by the permittivity ($\epsilon$) and permeability ($\mu$) of the medium. Permittivity is the dielectric property of the medium describing how an electromagnetic field affects, and is affected by, the medium.

Permeability describes degree of magnetization of a material in response to an electromagnetic field. While the matrix and the rods may exhibit different permittivity and permeability, a photonic crystal may be considered as having a substantially homogenous permittivity and permeability over a general region of the photonic crystal or over the entire photonic crystal.

For most materials, both permittivity and permeability are generally not a constant. Rather, they may vary with the position in the medium, the frequency of the electromagnetic field applied, humidity, temperature, and other parameters. In addition, permittivity and permeability may affect the refraction properties of the photonic crystal by varying the angle of refraction. Furthermore, the permittivity and permeability may be varied with multiple electrodes (360 and 370) on the third surface 230 and the fourth surface 240 to create localized changes in the electromagnetic field of the 2D photonic crystal 200, localized electrical current through the 2D photonic crystal 200, or combination thereof. Thus, by varying the permittivity and permeability of a 2D photonic crystal 200, the refraction angles of the refracted radiation may be altered.

Figure 10:
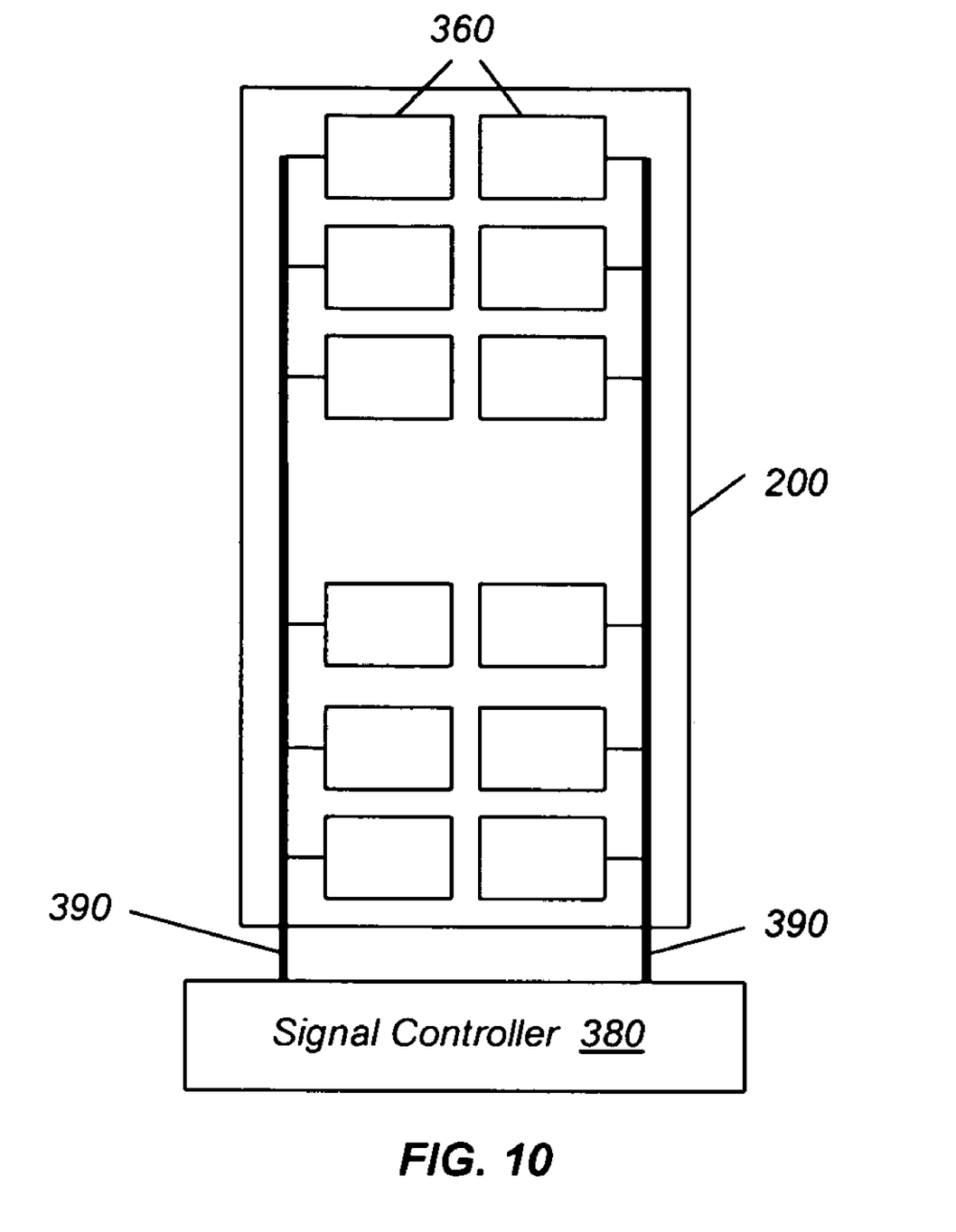
FIG. 10 is a top view of a representative 2D photonic crystal coupled to a signal controller.

FIG. 10 is a top view of the 2D photonic crystal 200 with the first electrodes 360 and the second electrodes (not shown) and a signal controller 380. The signal controller 380 may generate a plurality of electromagnetic signals 390 (shown as signal busses in FIG. 10) directed to a set of electrodes 360. In the embodiment of FIG. 10, the first electrodes 360 on the third surface 230 (FIG. 9) are shown, and for clarity, the second electrodes 370 on the fourth surface 240 (FIG. 9) are not shown. In this embodiment, the electrodes may be considered as pairs of electrodes, one for a first electrode 360 on the third surface 230, and one for a second electrode 370 on the fourth surface 240 and opposite the first electrode 360. Thus, a pair of electromagnetic signals 390 may be directed to each pair of electrodes to generate an electromagnetic field therebetween, an electrical current therebetween, or a combination thereof. As a result, each region of the 2D photonic crystal 200 located substantially between the electrode pair may be modified to adjust the refractive properties of the 2D photonic crystal 200 in that region. The signal controller 380 may control each pair of electrodes with a different signal to generate various electromagnetic fields at different regions of the 2D photonic crystal 200, as explained more fully below.

Figure 11:
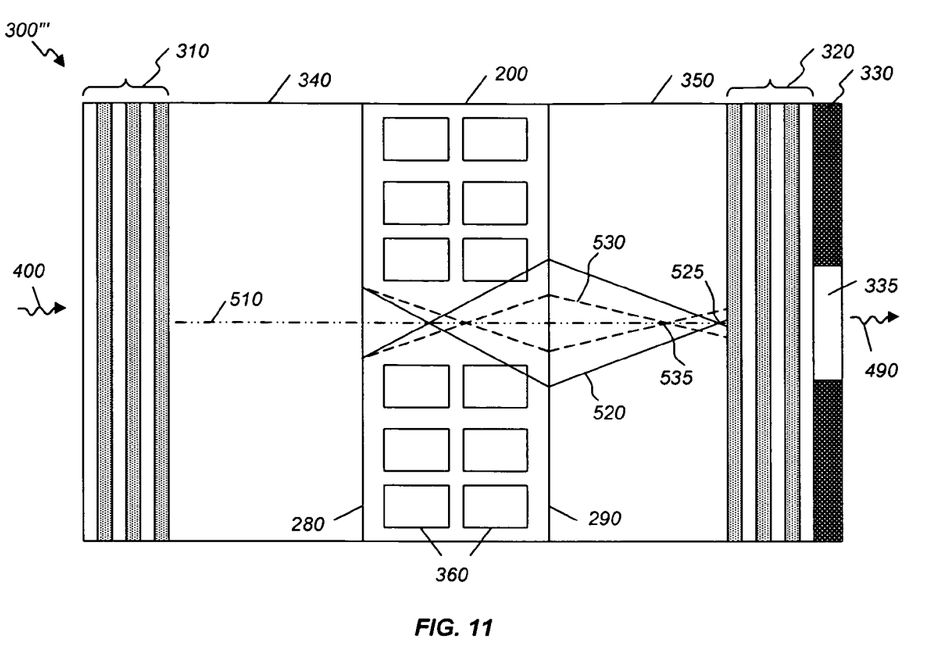
FIG. 11 is a top view of a representative electromagnetic radiation resonant structure illustrating dynamic focal point tuning.

FIG. 11 is a top view of an electromagnetic resonance device 300''' illustrating dynamic focal point tuning. The electromagnetic radiation tuning device 300''' includes an input reflector 310, an output reflector 320, and a 2D photonic crystal 200 disposed between the two reflectors (310, 320). The input reflector 310 and the 2D photonic crystal 200 are separated by a first intermediate medium 340 and the output reflector 320 is separated from the 2D photonic crystal 200 by a second intermediate medium 350. An aperture layer 330 with an aperture 335 formed therein may also be included as has been explained earlier. The 2D photonic crystal 200 may be formed with a gain medium (not shown) to form a laser device or without a gain medium to form a resonance device. Furthermore, gain medium may be included with the input reflector 310, the output reflector 320, or both, as previously discussed. Thus, gain medium may be included in any combination of the 2D photonic crystal 200, the input reflector 310 and the output reflector 320.

For ease of description, a beam axis 510 may be defined along a longitudinal axis of the 2D photonic crystal 200 and the intermediate media (340 and 350). For clarity, the rods of the 2D photonic crystal 200 and the second electrodes on the fourth surface are not shown. In addition, when describing the dynamic focal point tuning, for clarity in the figures and ease of description radiation beams are only illustrated in the 2D photonic crystal 200 and the second intermediate medium 350. Those of ordinary skill in the art will recognize that the description is equally applicable to radiation beams in the first intermediate medium 340.

By applying electromagnetic signals 390 (FIG. 10) between various pairs of the first electrodes 360 and the second electrodes 370 (not shown in FIG. 11), the negative refractive properties of the 2D photonic crystal 200 may be modified. If the electric signals are substantially uniform across the entire crystal, the refractive index of the 2D photonic crystal 200 may be modified symmetrically about the beam axis 510. However, the symmetric modification may be modified by applying a first set of electromagnetic signals to the column of electrodes nearest the first surface 280 and applying a different set of electromagnetic signals 390 to the column of electrodes near the second surface 290.

Thus, the refractive index, while being symmetric about the beam axis 312, may be modified at different points along the beam axis 312. As a result, the focused radiation beam 520 (illustrated by a solid line) with its focal point 525 may be modified by a focal distance along the beam axis 510 to a second focused radiation 530 (illustrated by a dashed line) with a different focal point 535. Of course, within the limits of the refractive properties of the 2D photonic crystal 200, a focal point may be dynamically adjusted to anywhere along the beam axis 510. This dynamic modification of the focal point may be used for a number of purposes. By way of example and not limitation, moving the focal point toward or away from a focal point near the interior surface of the reflector (310 and 320) may change the resonance characteristics of the resonance chamber because the radiation is either more or less intense as it impinges on the reflector (310 and 320). Similarly, with a gain medium (not shown) disposed on one or more of the reflectors (310 and 320) the resonance and amplification of a laser device may be modified due to the change of intensity of the radiation impinging at various locations within the gain medium.

In addition, the signal controller 380 (FIG. 7) may modify the electromagnetic signals 390 (FIG. 7) to compensate for variations in the permittivity and permeability of the 2D photonic crystal 200, as well as for variations in the reflectors (310 and 320) and the intermediate media (340 and 350). These variations may occur, for example, and not limitation, by manufacturing variations, manufacturing defects, wavelength of the pump radiation, wavelength of the lasing radiation, environmental conditions, and the like.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. An electromagnetic resonance device, comprising:
   an input reflector substantially reflective to a first radiation having a wavelength of interest;
   an output reflector in a plane substantially parallel to the input reflector and substantially reflective to a second radiation having the wavelength of interest;
   a negative index material disposed between the input reflector and the output reflector and exhibiting a negative refraction at the wavelength of interest, wherein the negative refraction:

focuses the first radiation impinging on the first surface as the second radiation at a second focal location; and focuses the second radiation impinging on the second surface as the first radiation at a first focal location.

2. The device of claim 1, wherein the input reflector and the output reflector comprise Bragg reflectors.

3. The device of claim 1, wherein the first focal location is substantially near an interior surface of the input reflector, and the second focal location is substantially near an interior surface of the output reflector.

4. The device of claim 1, wherein at least a portion of a pump radiation is transmitted through the input reflector to enter the electromagnetic radiation device.

5. The device of claim 4, wherein the negative index material comprises a periodic dielectric medium that includes a dielectric periodicity between the first surface and the second surface, the periodic dielectric medium configured with a gain medium configured to induce an amplification of the pump radiation to generate the first radiation and the second radiation.

6. The device of claim 1, further comprising at least one of a first gain medium disposed between an interior surface of the input reflector and the negative index material and a second gain medium disposed between an interior surface of the output reflector and the negative index material.

7. The device of claim 6, wherein the gain medium is configured to induce an amplification of a pump radiation to generate at least one of the first radiation and the second radiation, and wherein the amplification is sufficient to cause a lasing to occur.

8. The device of claim 6, wherein the gain medium is configured to induce an amplification of at least one of the first radiation and the second radiation, and wherein the amplification is sufficient to cause a lasing to occur.

9. The device of claim 8, wherein at least a portion of the second radiation is transmitted through the output reflector as a laser emitting radiation.

10. The device of claim 9, further comprising an aperture formed adjacent to the output reflector and configured to define a size and a shape of the laser emitting radiation.

11. The device of claim 1, wherein the negative index material comprises a periodic dielectric medium that includds a dielectric periodicity between the first surface and the second surface, the periodic dielectric medium configured with a gain medium configured to generate the first radiation and the second radiation resulting from electrical current pumping of the gain medium.

12. The device of claim 6, wherein the gain medium is configured to generate at least one of the first radiation and the second radiation resulting from electrical current pumping of the gain medium to cause a lasing to occur.

13. An electromagnetic resonance device, comprising:
an input reflector substantially reflective to a first radiation having a wavelength of interest;
an output reflector in a plane substantially parallel to the input reflector and substantially reflective to a second radiation having the wavelength of interest;
a negative index material disposed between the input reflector and the output reflector and exhibiting a negative refraction at the wavelength of interest, wherein the negative refraction:
focuses the first radiation impinging on the first surface as the second radiation at a second focal location;
focuses the second radiation impinging on the second surface as the first radiation at a first focal location;
at least one first electrode operably coupled to a third surface of the periodic dielectric medium; and
at least one second electrode operably coupled to a fourth surface of the periodic dielectric medium;
wherein the at least one first electrode and the at least one second electrode are configured for carrying at least one electromagnetic signal developed to modify the first focal location and the second focal location.

14. The device of claim 13, wherein the at least one electromagnetic signal is further configured to modify a first distance between the first focal location and the interior surface of the input reflector and modify a second distance between the second focal location and the interior surface of the output reflector.

15. A method of intensifying an electromagnetic radiation beam, comprising:
providing a negative index material comprising a negative refractive index at a wavelength of interest;
reflecting a first radiation toward a first surface of the negative index material;
reflecting a second radiation toward a second surface of the negative index material;
focusing the second radiation at a second focal location by passing the first radiation through the negative index material from the first surface to the second surface; and
focusing the first radiation at a first focal location by passing the second radiation through the negative index material from the second surface to the first surface.

16. The method of claim 15, wherein reflecting the first radiation comprises reflecting the first radiation with an input reflector and reflecting the second radiation comprises reflecting the second radiation with an output reflector.

17. The method of claim 15, further comprising:
amplifying the first radiation and the second radiation with a gain medium disposed within the negative index material;
wherein providing the negative index material comprises providing a periodic dielectric medium that includes a dielectric periodicity between the first surface and the second surface.

18. The method of claim 15, further comprising amplifying the first radiation with a first gain medium disposed substantially near an interior surface of the input reflector.

19. The method of claim 15, further comprising amplifying the second radiation with a second gain medium disposed substantially near an interior surface of the output reflector.

20. The method of claim 15, wherein amplifying the first radiation and the second radiation is sufficient to cause a lasing to occur.

21. The method of claim 20, further comprising transmitting at least a portion of the second radiation though the output reflector as a laser emitting radiation.

22. The method of claim 15, further comprising:
applying at least one electromagnetic signal to at least a portion of the negative index material;
modifying a position of the first focal location in response to the at least one electromagnetic signal; and
modifying a position of the second focal location in response to the at least one electromagnetic signal;
wherein providing the negative index material comprises providing a periodic dielectric medium that includes a dielectric periodicity between the first surface and the second surface.

* * * * *

UNITED STATES PATENT AND TRADEMARK OFFICE
CERTIFICATE OF CORRECTION

PATENT NO. : 7,352,941 B2 Page 1 of 1
APPLICATION NO. : 11/590410
DATED : April 1, 2008
INVENTOR(S) : Alexandre M. Bratkovski et al.

It is certified that error appears in the above-identified patent and that said Letters Patent is hereby corrected as shown below:

In column 13, line 44, in Claim 11, delete "includds" and insert -- includes --, therefor.

In column 14, line 53, in Claim 21, delete "though" and insert -- through --, therefor.

Signed and Sealed this

Fourteenth Day of July, 2009

JOHN DOLL
*Acting Director of the United States Patent and Trademark Office*